(12) United States Patent
Danks (10) Patent No.: US 8,994,742 B2
(45) Date of Patent: Mar. 31, 2015

(54) SYSTEMS AND METHODS FOR SEAM RESOLUTION

(71) Applicant: 3D Systems, Inc., Rock Hill, SC (US)

(72) Inventor: Mark Edward Danks, Berkeley, CA (US)

(73) Assignee: 3D Systems, Inc., Rock Hill, SC (US)

( * ) Notice: Subject to any disclaimer, the term of this patent is extended or adjusted under 35 U.S.C. 154(b) by 198 days.

(21) Appl. No.: 13/654,545

(22) Filed: Oct. 18, 2012

(65) Prior Publication Data

US 2013/0100092 A1 Apr. 25, 2013

Related U.S. Application Data

(60) Provisional application No. 61/548,500, filed on Oct. 18, 2011.

(51) Int. Cl.
| | | |
|---|---|---|
| G09G 5/00 | (2006.01) | |
| G09G 5/02 | (2006.01) | |
| G09G 5/10 | (2006.01) | |
| G06T 15/00 | (2011.01) | |
| H04N 1/46 | (2006.01) | |
| H04N 1/40 | (2006.01) | |
| G06K 9/36 | (2006.01) | |
| G06T 15/20 | (2011.01) | |
| G06T 11/00 | (2006.01) | |
| G06T 15/04 | (2011.01) | |
| H04N 13/00 | (2006.01) | |

(52) U.S. Cl.
CPC ............... G06T 15/205 (2013.01); G09G 5/00 (2013.01); G06T 11/001 (2013.01); G06T 15/04 (2013.01); H04N 13/00 (2013.01)
USPC ........... 345/582; 345/419; 345/591; 345/619; 345/690; 345/156; 358/505; 358/448; 382/285

(58) Field of Classification Search
USPC ......... 345/418–419, 581–582, 589–591, 592, 345/594, 617–619, 690, 156, 168, 204, 207, 345/691; 358/505, 537, 448, 452–453, 474; 382/276, 282, 285, 307
See application file for complete search history.

(56) References Cited

U.S. PATENT DOCUMENTS

| | | | | |
|---|---|---|---|---|
| 7,664,322 | B1 * | 2/2010 | Wilensky | 382/181 |
| 2007/0237420 | A1 * | 10/2007 | Steedly et al. | 382/284 |
| 2009/0040224 | A1 * | 2/2009 | Igarashi et al. | 345/427 |
| 2009/0257662 | A1 * | 10/2009 | Rudin et al. | 382/218 |
| 2011/0211771 | A1 * | 9/2011 | Rubenstein et al. | 382/299 |
| 2014/0205200 | A1 * | 7/2014 | Zeng | 382/274 |

* cited by examiner

Primary Examiner — Wesner Sajous

(57) ABSTRACT

Systems and methods are provided for resolving seams in computer graphics when a two-dimensional image is applied to a three-dimensional structure. The method can include providing a two-dimensional image in a UV space, identifying at least one sub-image on the two-dimensional image, defining a seam connectivity for the two-dimensional image in the UV space, and remapping the location of an object on the two-dimensional image when the location of the object is within at least one seam boundary of the seam map.

28 Claims, 5 Drawing Sheets

SYSTEMS AND METHODS FOR SEAM RESOLUTION

CLAIM OF PRIORITY

This application claims the benefit of priority under 35 U.S.C. §119(e) of U.S. Provisional Application Ser. No. 61/548,500, filed on Oct. 18, 2011, which application is incorporated by reference herein.

FIELD

The present invention relates generally to computer graphics. More particularly, the present invention relates to systems and methods for resolving seams in computer graphics when a two-dimensional image is applied to a three-dimensional structure.

BACKGROUND

As is known in computer graphics, a two-dimensional image or texture can be applied to a three-dimensional geometry. For example, a two-dimensional photograph can be wrapped around a three-dimensional object. When this is done, seams on the three-dimensional geometry can occur.

Figure 1:
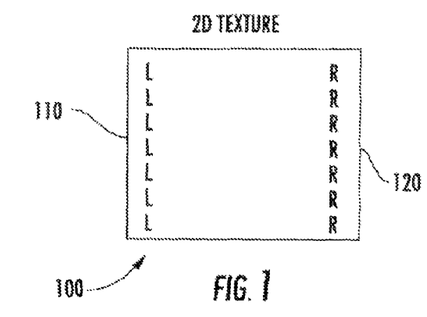
FIG. 1 is a plan view of a two-dimensional image.
Figure 2:
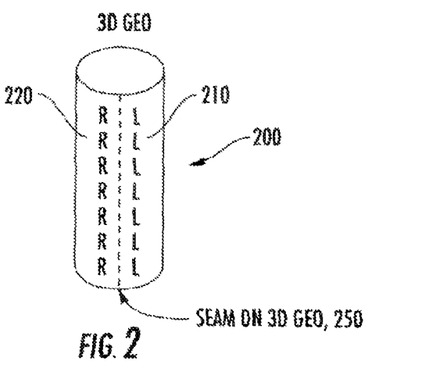
FIG. 2 is a plan view of a three-dimension geometry corresponding to the two-dimensional image of FIG. 1.

FIG. 1 is a plan view of a two-dimensional image 100, and FIG. 2 is a plan view of a three-dimensional geometry 200 corresponding to the two-dimensional image 100 of FIG. 1. As seen in FIG. 1, the two-dimensional image 100 is a rectangle. A left edge 110 of the rectangle includes a column of the letter "L" and a right edge 120 of the rectangle includes a column of the letter "R.

To create the three-dimensional geometry 200 shown in FIG. 2, the left edge 110 of the two-dimensional rectangle 100 can be wrapped around to reach the right edge 120 of the two-dimensional rectangle 100. Then, as seen in FIG. 2, the resulting geometry 200 can be a cylinder with the left edge 210 of the rectangle (column of "L") connecting with the right edge 220 of the rectangle (column of "R"). The connection of the left and right edges 210, 220 of the rectangle creates a seam 250 on the three-dimensional geometry 200.

Figure 3:
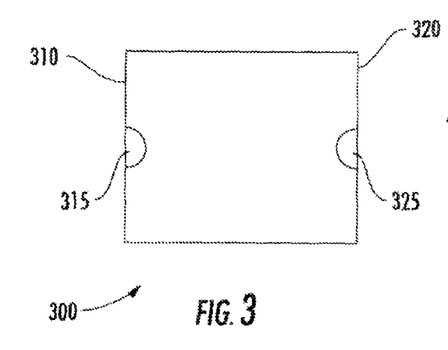
FIG. 3 is a plan view of a two dimensional image with first and second cut-outs on respective first and second edges thereof.

When it is known in advance that a two-dimensional image will be mapped into a three-dimensional geometry, the two-dimensional image can be mapped or drawn in such a way to hide any resulting seams when the three-dimensional geometry is created. For example, FIG. 3 is a plan view of a two-dimensional image 300 with first and second cut-outs 315, 325 on respective first and second edges 310, 320 thereof. Each of the first and second cut-outs 315, 325 can have a semi-circular shape.

Figure 4:
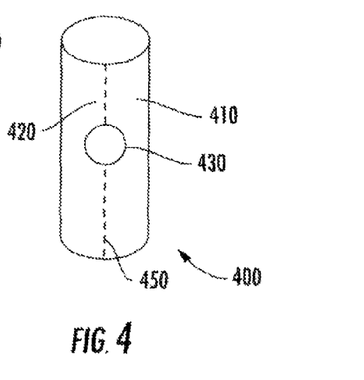
FIG. 4 is a plan view of a three-dimensional geometry corresponding to the two-dimensional image of FIG. 3.

FIG. 4 is a plan view of a three-dimensional geometry 400 corresponding to the two-dimensional image 300 of FIG. 3. As seen in FIG. 4, when the left edge 310 of the two-dimensional rectangle 300 is wrapped around to reach the right edge 320 of the two-dimensional rectangle 300, the first and second cut-outs 415, 425 can meet on the seam 450 to form an aperture 430 having a circular shape. Thus, the seam 450 is hidden in the area of the circular aperture 430.

Problems arise when the shape of a three-dimensional geometry is not known in advance because, in these situations, the corresponding two-dimensional image cannot be mapped to hide resulting seams. For example, when a three-dimensional geometry is customized with decals, a corresponding two-dimensional image cannot be mapped in advance to hide seams created by the decals.

Figure 5:
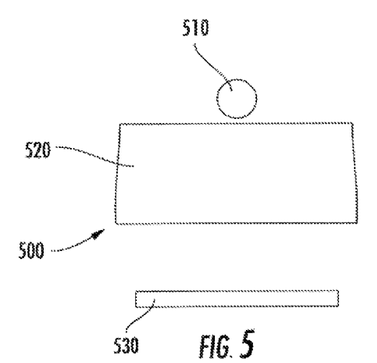
FIG. 5 is plan view of an exemplary two-dimensional image.
Figure 6:
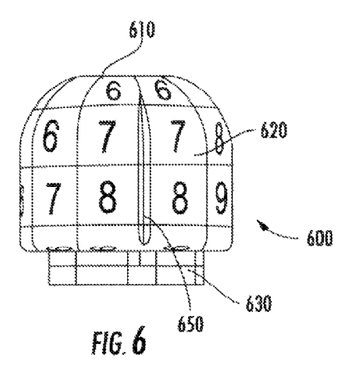
FIG. 6 is a plan view of a three-dimensional structure corresponding to the two-dimensional image of FIG. 5.

FIG. 5 is plan view of an exemplary two-dimensional image 500, and FIG. 6 is a plan view of a three dimensional structure 600 corresponding to the two-dimensional image 500 of FIG. 5. The first sub-image 510 in FIG. 5 corresponds to the top portion 610 of the structure 600 in FIG. 6, the second sub-image 520 in FIG. 5 corresponds to the middle portion 620 of the structure 600 in FIG. 6, and the third sub-image 530 in FIG. 5 corresponds to the bottom portion 6300 of the structure 600 in FIG. 6. As seen in FIG. 6, when a pattern or texture is applied to the image 500 in FIG. 5, a seam 650 results when the image with the is pattern mapped into the structure 600 of FIG. 6.

Figure 7:
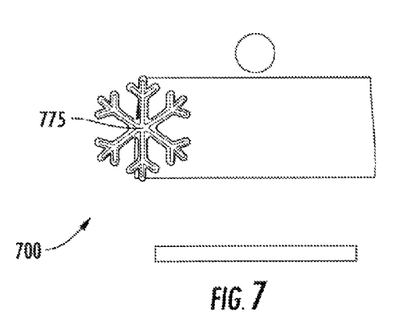
FIG. 7 is a plan view of an exemplary two-dimensional image including a user-placed decal.
Figure 8:
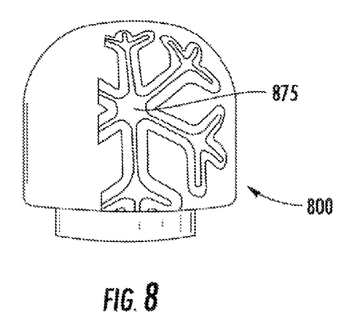
FIG. 8 is a plan view of a three-dimensional structure corresponding to the two-dimensional image and decal of FIG. 7.

As seen in FIG. 7, a user can customize the two-dimensional image 700 by, for example, arbitrarily placing a decal 775 on the image 700 at any desired location. When the decal 775 is applied without accounting for seams, a structure 800 as is shown in FIG. 8 can result when the image 700 with the decal 775 is mapped onto a three-dimensional structure. That is, the decal 875 can be shown on the three-dimensional structure 800 incompletely, inaccurately, and/or with seams.

Systems and methods have been developed to address the above-identified problems. For example, decal projection has been used. In decal projection, the texture, including the shape and size, of a decal can be projected onto a three-dimensional structure. This is akin to shining a flashlight onto a three-dimensional structure and applying the decal anywhere the light hits. For example, if the flashlight projects a square light, then the resulting decal can be square and be rotated and sized.

However, decal projection has presented significant disadvantages. For example, shadows, such as where the three-dimensional structure occludes itself, can occur. Furthermore, bleeding of the decal onto the other side of the structure can occur, and bad stretching, for example, when the structure is parallel to light rays, can occur.

In view of the above, improved systems and methods are desired for resolving seams in computer graphics when two-dimensional image is applied to a three-dimensional structure.

SUMMARY

According to some embodiments, a method is provided. The method can include providing a two-dimensional image in a UV space, identifying, with control circuitry, at least one sub-image on the two-dimensional image, and defining, with control circuitry, a seam connectivity for the two-dimensional image in the UV space.

The method can also include receiving, via an input mechanism, a user-selected location for an object on a representation of a three-dimensional structure, generating, with the control circuitry, a UV location for the object on the two-dimensional image, determining if a V location of the object is within at least one seam boundary on the two-dimensional image, and when the V location of the object is within the at least one seam boundary on the two-dimensional image, the control circuitry remapping the object onto the two-dimensional image.

A system including executable control software stored on a non-transitory computer readable medium, and at least one programmable processor is also provided. The programmable processor can execute the methods described above, and others in accordance with embodiments of the present invention.

DESCRIPTION OF THE PREFERRED EMBODIMENTS

While this invention is susceptible of embodiments in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Various embodiments are described that include systems and methods for resolving seams in computer graphics when a two-dimensional image is applied to a three-dimensional structure.

In accordance with some embodiments, a seam map of a two-dimensional image can be created that contains connectivity information for mapping the two-dimensional image onto a three-dimensional structure. Then, the seam map can be used so that objects on the two-dimensional image span the three-dimensional object correctly and without seams, even though the two dimensional image does not connect where the object spans. In some embodiments, a seam map can include a two-dimensional image of a geometry mapped in a UV space.

It is to be understood that a UV space is space in which a two-dimensional image is mapped into a three-dimensional image or structure. For example, U and V axes can define a two-dimensional UV space, and X, Y, and Z axes can define a three-dimensional space.

U and V can be considered akin to X and Y. However, a UV space is only a texture space rather than in a geometrical space. But texture coordinates in a UV space can be used to map a two-dimensional image into a three-dimensional (X, Y, Z) space. The converse is also true. That is, an object in a three-dimensional space can be mapped into a UV space.

For example, in some embodiments, UV coordinates can represent a projection of a unit space vector with X, Y, and X coordinates onto the XY plane. That is, U can be defined as follows:

$$U = \sin\theta \cos\phi = X/\sqrt{(X^2+Y^2+Z^2)}$$

Similarly, V can be defined as follows:

$$V = \sin\theta \sin\phi = Y/\sqrt{(X^2+Y^2+Z^2)}$$

Figure 9:
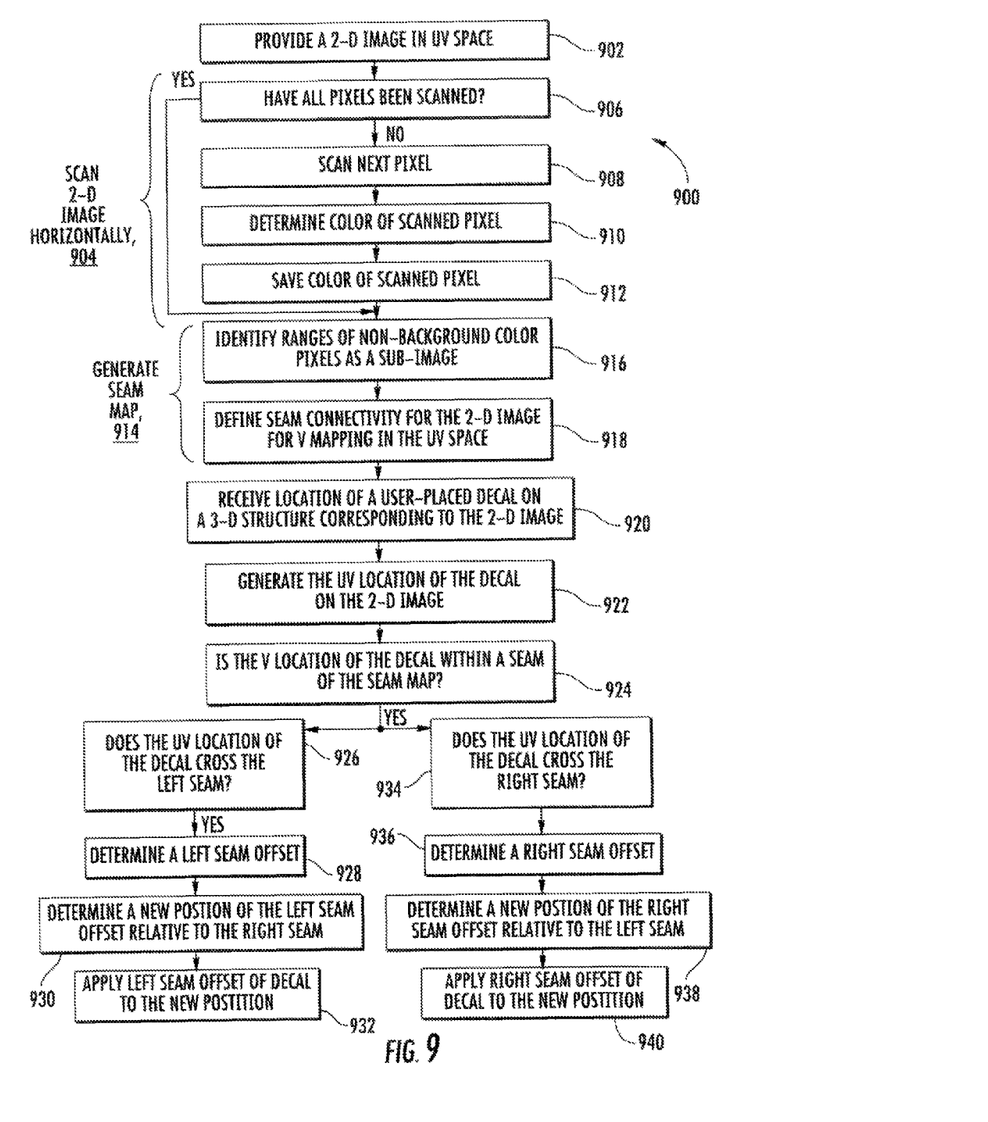
FIG. 9 is a flow diagram of a novel exemplary method.
Figure 13:
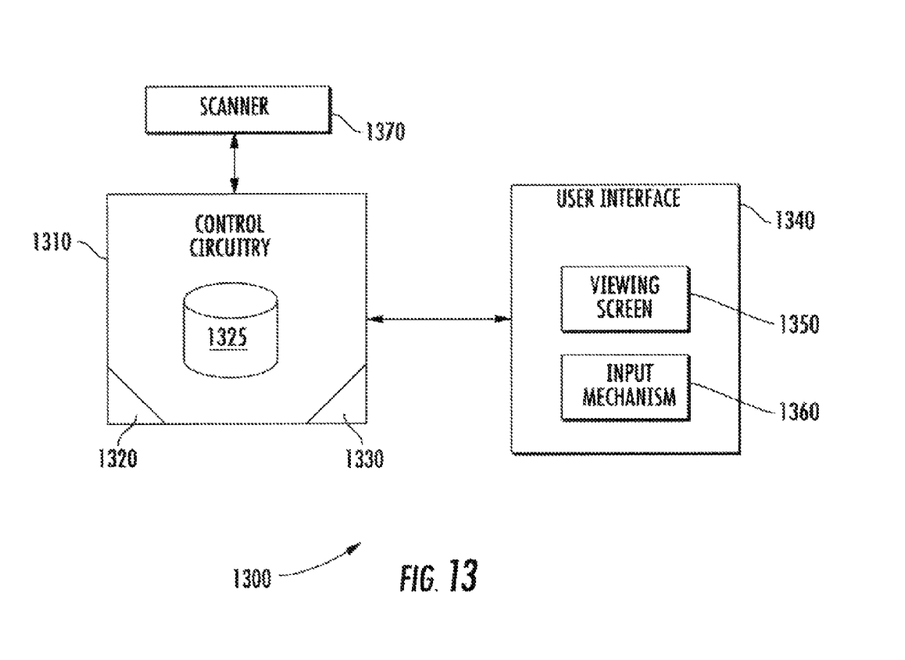
FIG. 13 is a block diagram of a system for carrying out the method of FIG. 9 and others in accordance with embodiments of the present invention.

Referring now to the figures, FIG. 13 is a block diagram of a system 1300 for carrying out the exemplary method 900 shown in FIG. 9 and others in accordance with embodiments of the present invention. As seen in FIG. 13, the system 1300 can include control circuitry 1310, one or more programmable processors 1320, and executable control software 1330 as would be understood by those of skill in the art. In some embodiments, the control circuitry 1310 can include a memory device 1325.

The executable control software 1330 can implement the exemplary method described herein, for example, as illustrated in FIG. 9. The executable control software 1330 can be stored on a transitory media or non-transitory computer readable medium including, but not limited to, local computer memory, RAM, optical storage media, magnetic storage media, flash memory, etc.

A scanner 1370 can be in communication with the control circuitry 1310, and a user interface device 1340 can also be in communication with the control circuitry 1310. A viewing screen 1350 of the user interface device 1340, as would be known by those of skill in the art, can display interactive and viewing windows. In some embodiments, the user interface device 1340 can be a multidimensional graphical user interface, and in some embodiments, the user interface device 1340 can include one or more input mechanisms 1360, for example, a keypad or a mouse, can receive user input.

For example, the input mechanism 1360 can receive information from a user related to the location of a user-placed decal on a three-dimensional structure. The viewing screen 1350 can display to a user an image of the structure with the decal. In some embodiments, the control circuitry 1310, programmable processors 1320, and executable control software 1330 can determine a seam map for a two-dimensional image corresponding to the three-dimensional structure and, if necessary, remap the user-placed decal onto the two-dimensional image to account for seams when the decal is subsequently applied, for example, printed onto a three-dimensional structure.

FIG. 9 is a flow diagram of a novel exemplary method 900. As explained above, the exemplary method shown in FIG. 9 and others in accordance with embodiments of the present invention can be carried out with the system 1300 and other systems in accordance with embodiments of the present invention.

As seen in FIG. 9, a two-dimensional image in a UV space can be provided as in 902. For example, the image can be provided on the viewing screen 1350 of the user interface device 1340. In some embodiments, the exemplary two-dimensional image 1000 in UV space shown in FIG. 10 can be provided as in 902.

Figure 10:
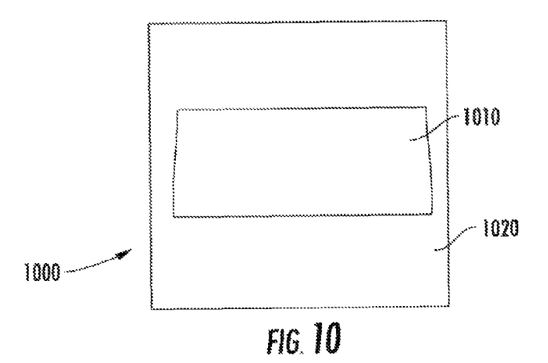
FIG. 10 is a plan view of an exemplary two-dimensional image in a UV space.

In some embodiments, the two-dimensional image in UV space, for example, the image 1000, can be obtained from an image of a three-dimensional structure. For example, an image of a three-dimensional structure can be mapped into UV space using UV coordinates of triangles on the three-dimensional structure.

When mapped into UV space, an island of interest in the UV space can be determined. For example, an island can be a non-background color geometry with connecting coordinates in UV space. That is, all geometry in an island is connected in UV space and is contained entirely within a border of a UV seam. An island of interest in the UV space can be the island with a UV seam to be resolved in accordance with the systems and methods described herein.

As seen in FIG. 10, the island of interest in the two-dimensional image 1000 is the sub-image 1010. The sub-image 1010 has a constant color. For example, the color of the sub-image 1010 can be white. However, embodiments of the present invention are not so limited. Rather, the sub-image 1010 can be any color. In some embodiments, the color of the sub-image 1010 can be constant throughout the sub-image 1010, and in some embodiments, the color of the sub-image 1010 can be a different than the color of the background 1020.

After the two dimensional image in the UV space is provided as in 902, the method 900 can scan through the image horizontally from a first side of the image to a second side of the image as in 904. For example, the scanner 1370 in communication with the control circuitry 1310 can scan the image.

In some embodiments, the method can scan the image pixel by pixel as in 908. While scanning the image, the method can determine the color of each pixel as in 910 and save, in a memory, for example, the color of each pixel as in 912. For example, the control circuitry 1310, programmable processors 1320, and executable control software 1330 can determine the color of each pixel and save the color of each pixel in the memory device 1325.

For example, if the method determines that a particular pixel is a color that is different than the color of the background portion of the image, then the location of the non-background color pixel can be saved, for example, in the memory device 1325. When the method finds a series of non-background color pixels, the method can determine that it is scanning a sub-image of the image.

When the method is scanning a sub-image of the image, the method can continue scanning the image. When the method determines that a particular pixel is a background color or that the right edge of the image has been reached and there are no more pixels to scan, the location of the background color pixel or the last non-background color pixel can be saved, for example, in the memory device 1325

After horizontal scanning of the image is complete as in 904, the range of pixels that are non-background color can be identified as a sub-image of the image as in 916. The range of pixels constituting a sub-image of the image can define the seam connectivity for image in the V mapping of the UV space as in 918. That is, for any given V value identified as a seam, the corresponding U value can be mapped to account for a seam of the sub-image in a three-dimensional structure. The image, with the identified sub-image and seam connectivity, can constitute a seam map in accordance with some embodiments. Accordingly, in some embodiments, the control circuitry 1310, programmable processors, and executable control software 1330 can generate the seam map.

In some embodiments, defining the seam connectivity for an image can include identifying edges, that is, seams, of a sub-image. For example, defining the seam connectivity can include identifying areas of a sub-image in which seams will occur when the sub-image is applied to a three-dimensional structure.

In some embodiments, when a seam map image as in 914 is created, seams, that is, edges of a sub-image, can be indicated with a different colored pixel, for example, a red or blue colored. In these embodiments, subsequent processing can be eased because the method can easily and readily identify the location of seams.

According to some embodiments, a user can place or select a location for placing a decal or other object on a three-dimensional structure as in 920. For example, the user can enter input via the input mechanisms 1360 of the user interface device 1340 to place or select a location for placing the decal.

Then, the method 900 can generate a UV location of the decal on the two-dimensional image as in 922. For example, the control circuitry 1310, programmable processors 1320, and executable control software 1330 can generate the UV location of the decal.

In some embodiments, if a user places a decal with a computer mouse, a ray collision test can be conducted between the mouse location and the three-dimensional geometry to generate a UV location of the decal on the corresponding and underlying two-dimensional image.

The V location of the UV location of the decal can be compared with the seam map generated to determine if the UV location is within a seam on the seam map as in 924. If the UV location of the decal is within the bounds of a seam, additional steps can occur.

For example, if the UV location of the decal is within the bounds of the seam map, the method can determine if the UV location of the decal crosses a left seam boundary as in 926. If the UV location of the decal does cross the left seam boundary, the method can account for a scaled and rotated decal by determining the left seam offset as in 928, computing the new position of the left seam offset relative to the right seam as in 930, and applying the left seam offset of the decal at the new position as in 932.

In some embodiments, the control circuitry 1310, programmable processors 1320, and executable control software 1330 can determine if the UV location of the decal is within a seam on the seam map and crosses a left seam boundary. If so, the control circuitry 1310, programmable processors 1320, and executable control software 1330 can determine the left seam offset, compute the new position of the left seam offset, and apply the left seam offset at the new position.

In some embodiments, the left seam offset, delta L, can be equal to the original decal position minus the left seam location. Further, the new position of the left seam offset relative to the right seam can be equal to the right seam location plus the left seam offset, delta L.

If the original UV location of the decal is within the bounds of the seam map, the method can also determine if the original UV location of the decal crosses a right seam boundary as in 934. If the UV location of the decal does cross the right seam boundary, the method can account for a scaled and rotated decal by computing the right seam offset as in 936, computing the new position of the right seam offset relative to the left seam as in 938, and applying the right seam offset of the decal at the new position as in 940.

In some embodiments, the control circuitry 1310, programmable processors 1320, and executable control software 1330 can also determine if the UV location of the decal crosses a right seam boundary and, if so, compute the right seam offset, compute the new position of the right seam offset, and apply the right seam offset at the new position.

In some embodiments, the right seam offset, delta R, can be equal to the original decal position minus the right seam location. Further, the new position of the right seam offset relative to the left seam can be equal to the left seam location plus the right seam offset, delta R.

Applying any left and right seam offsets of a decal to new positions on the two-dimensional image as in 932 and 940 can constitute remapping the decal onto the image. In some embodiments, remapping a decal onto a two-dimensional image can account for seams when the image and decal are applied to a three-dimensional structure.

Figure 11:
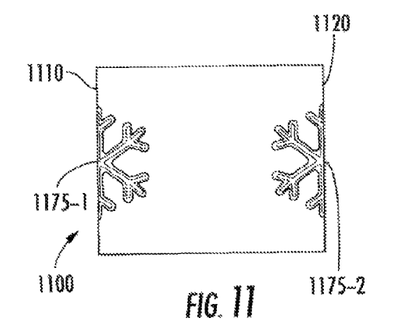
FIG. 11 is a plan view of the two-dimensional image of FIG. 10 with a decal remapped thereon.

FIG. 11 is a plan view of the two-dimensional image 1000 of FIG. 10 with a decal remapped thereon. As seen in FIG. 11, the decal has been remapped so that a first portion 1175-1 of the decal appears near a left edge 1110 of the sub-image 1100, and a second portion 1175-2 of the decal appears near a right edge 1120 of the sub-image 1100.

Figure 12:
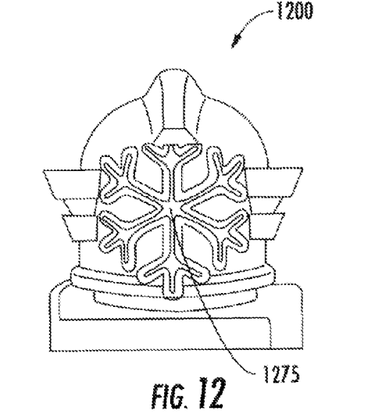
FIG. 12 is a plan view of a three-dimensional structure corresponding to the two-dimensional image and remapped decal of FIG. 11.

The image 1100 shown in FIG. 11 can be applied or mapped onto a three-dimensional structure 1200 shown in FIG. 12. As seen in FIG. 12, any seam that results in connecting the left and right sides 1110, 1120 of the two-dimensional image 1100 of FIG. 11 can be resolved and, in embodiments, invisible to the human eye. An image of the structure 1200 can be displayed on the viewing screen 1350 of the user interface device 1340, and in some embodiments, the structure 1200 can be printed using a three-dimensional printer as is known in the art.

Further embodiments include masking of certain portions of a two-dimensional image in a UV space. In some embodiments in which multiple sub-images are included in the two-dimensional image in a UV space, such as the image of FIG. 5 for example, when a decal or other object is positioned in such a way that it is positioned on two sub-images (for example first sub-image 510 and second sub-image 520), the portion of the object that would otherwise appear on a second sub-image is masked so that the portion of the object is only visible on the intended sub-image of the structure. This automatic masking prevents objects from unintentionally appearing on sub-images other than the intended sub-image. In a preferred embodiment, the sub-image upon which the center of the object is positioned is the only sub-image upon which the object appears because the portion(s) of the sub-image which would otherwise appear on other sub-images are masked.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method comprising:
providing a two-dimensional image in a UV space; and
generating a seam map for mapping the two-dimensional image in the UV space onto a three-dimensional image or structure in a three-dimensional space, including:
identifying, with control circuitry, at least one sub-image on the two-dimensional image; and
defining, with the control circuitry, a seam connectivity for the two-dimensional image in the UV space,
wherein the seam map includes the at least one sub-image and seam connectivity.

2. The method of claim 1 wherein providing the two-dimensional image in the UV space includes providing the two-dimensional image with the at least one sub-image with a constant color.

3. The method of claim 2 wherein providing the two-dimensional image with the at least one sub-image with the constant color includes providing the sub-image with a non-background color.

4. The method of claim 1 wherein identifying, with the control circuitry, the at least one sub-image on the two-dimensional image includes a scanner horizontally scanning the two-dimensional image pixel by pixel.

5. The method of claim 4 further comprising determining a color of each pixel in the two-dimensional image.

6. The method of claim 5 further comprising identifying a range of non-background color pixels in the two-dimensional image as the at least one sub-image.

7. The method of claim 1 wherein defining a seam connectivity, with the control circuitry, for the two-dimensional image includes identifying at least first and second seams of the at least one sub-image.

8. The method of claim 7 further comprising identifying each pixel associated with the at least first and second seams with a unique color.

9. The method of claim 1 further comprising:
receiving, via an input mechanism, a user-selected location for an object on a representation of a three-dimensional structure;
generating, with the control circuitry, a UV location for the object on the two-dimensional image, the UV location being composed of a U location and a V location;
determining, based on the seam map, if the V location of the object is within at least one seam boundary on the two-dimensional image; and
when the V location of the object is within the at least one seam boundary on the two-dimensional image, the control circuitry remapping the object onto the two-dimensional image.

10. The method of claim 9 wherein when the V location of the object is within the at least one seam boundary, the control circuitry determining an offset for the at least one seam boundary and determining a new position of the at least one seam boundary on the two-dimensional image relative to a second seam boundary.

11. The method of claim 10 wherein remapping the object includes applying the offset for the at least one seam boundary to the new position on the two-dimensional image.

12. The method of claim 10 wherein determining the offset for the at least one seam boundary includes subtracting a location of the at least one seam boundary from the user-selected location for the object.

13. The method of claim 10 wherein determining the new position of the at least one seam boundary includes adding a location of the second seam boundary to the offset for the at least one seam boundary.

14. The method of claim 9 further comprising applying the two-dimensional image with the remapped object onto a three-dimensional structure, wherein seams of the object on the three-dimensional structure are resolved.

15. A system comprising:
executable control software stored on a non-transitory computer readable medium; and
at least one programmable processor configured to execute the control software for:
providing a two-dimensional image in a UV space; and
generating a seam map for mapping the two-dimensional image in the UV space onto a three-dimensional image or structure in a three-dimensional space, including:
identifying at least one sub-image on the two-dimensional image; and defining a seam connectivity for the two-dimensional image in the UV space,
wherein the seam map includes the at least one sub-image and seam connectivity.

16. The system of claim 15 wherein the programmable processor provides two-dimensional image with the at least one sub-image with a constant color.

17. The system of claim 16 wherein the programmable processor provides the sub-image with a non-background color.

18. The system of claim 15 wherein the programmable processor horizontally scans the two-dimensional image pixel by pixel.

19. The system of claim 18 wherein the programmable processor determines a color of each pixel in the two-dimensional image.

20. The system of claim 19 wherein the programmable processor identifies a' range of non-background color pixels in the two-dimensional image as the at least one sub-image.

21. The system of claim 15 wherein the programmable processor identifies at least first and second seams of the at least one sub-image.

22. The system of claim 21 wherein the programmable processor identifies each pixel associated with the at least first and second seams with a unique color.

23. The system of claim 15 wherein the programmable processor:
receives a user-selected location for an object on a representation of a three-dimensional structure,
generates a UV location for the object on the two-dimensional image, the UV location being composed of a U location and a V location,
determines if the V location of the object is within at least one seam boundary on the two-dimensional image, and
when the V location of the object is within the at least one seam boundary on the two-dimensional image, remaps the object onto the two-dimensional image.

24. The system of claim 23 wherein when the V location of the object is within the at least one seam boundary, the programmable processor determines an offset for the at least one seam boundary and determines a new position of the at least one seam boundary on the two-dimensional image relative to a second seam boundary.

25. The system of claim 24 wherein the programmable processor applies the offset for the at least one seam boundary to the new position on the two-dimensional image to remap the object.

26. The system of claim 24 wherein the programmable processor subtracts a location of the at least one seam boundary from the user-selected location for the object to determine the offset for the at least one seam boundary.

27. The system of claim 24 wherein the programmable processor adds a location of the second seam boundary to the offset for the at least one seam boundary to determine the new position of the at least one seam boundary.

28. The system of claim 23 wherein the programmable processor transmits information to a three-dimensional printer for applying the two-dimensional image with the remapped object onto a three-dimensional structure, wherein, upon printing, seams of the object on the three-dimensional structure are resolved.

* * * * *